United States Patent Office 2,952,685
Patented Sept. 13, 1960

2,952,685

PHENYLACETIC ESTERS HAVING TWO BASIC SUBSTITUENTS AND PRODUCTION THEREOF

Henry Najer and Pierre E. Chabrier de Lassauniere, Paris, and Pierre R. L. Giudicelli, Fontenay-sous-Bois, France, assignors to Les Laboratoires Dausse (Societe Anonyme), Paris, France, a company of France No Drawing. Filed July 25, 1958, Ser. No. 750,861

Claims priority, application France July 25, 1957

3 Claims. (Cl. 260—294.3)

In effecting synthesis of phenylacetic esters having two basic substituents, we have found that new compounds of utility for therapeutics, particularly compounds producing a spasmolytic effect and compounds producing a sedative effect on central nervous system can be provided.

Among the new compounds provided according to our invention are dibasic esters corresponding to the general Formula 1 and acid addition salts thereof from pharmaceutically acceptable acids:

(1) 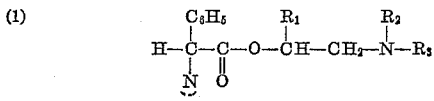

In the foregoing Formula 1

$R_1$ stands for a hydrogen atom, $R_2$ and $R_3$ stand each for an ethyl group or, jointly with N (to which $R_2$ is attached), for a piperidino group, a 1,2,5,6-tetrahydropyridino group or a morpholino group, or else $R_1$ and $R_2$ jointly represent a trimethylene chain linking the CH and N to which they are shown as attached, $R_3$ represents an ethyl group, while $N$⟩ represents a pyrrolidino, morpholino, 1,2,5,6-tetrahydropyridino, piperidino, 3-methyl-piperidino or 4-methyl-piperidino group, provided —N⟩ does not represent a piperidino group where

represent a diethylamino or piperidino group.

According to this invention, we further provide a process for the production of the compounds corresponding to Formula 1, wherein halo-compounds of the general formula (2) 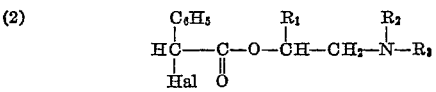

are condensed with secondary amines of the formula H N⟩ (the letters in the formulas having the significance mentioned with reference to Formula 1, while Hal represents a halogen atom, more particularly a chlorine atom) in the presence of an agent capable of binding the hydrogen halide H Hal, the condensation being carried out preferably in an anhydrous medium, particularly in benzene at reflux temperature.

Instead of benzene, other aromatic hydrocarbons such for example as toluene or xylene may also be employed.

All the esters corresponding to Formula 1 are spasmolytics but the β-diethylamino-ethyl α-phenyl-α-tertiary-amino-acetates are particularly desirable because they further possess a central sedative activity.

We have further found that other compounds which are also new and of interest for therapeutics, in particular as spasmolytic agents, may be obtained by condensing halo-compounds similar to those above mentioned and corresponding to the general formula (3) 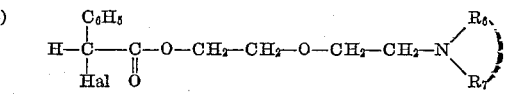

with piperidine or 1,2,5,6-tetrahydropyridine, the condensation being carried out in a similar manner to that effected for producing the compounds of Formula 1.

In the general Formula 3, Hal has the same significance as above, while

represents a diethylamino, morpholino or piperidino group.

The esters thus produced correspond to the general formula (4) 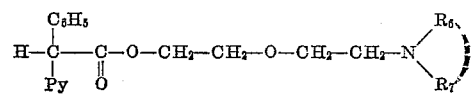

in which Py represents a 1,2,5,6-tetrahydro-pyridino or a piperidino group.

The dibasic esters corresponding to the general Formulas 1 and 4 are viscous oils, which can be distilled in high vacuums and are soluble in organic solvents such as ethyl alcohol, ether and benzene but are insoluble in water. For practical use thereof it is desirable in most cases to convert said esters into water-soluble derivatives thereof, particularly acid addition salts or in the case of esters corresponding to the general Formula 4 into diquaternary ammonium compounds, in accordance with the known general methods heretofore described in the literature. In particular, dihydrochlorides and dihydrobromides may be prepared in accordance with this invention; the dihydrochlorides generally are crystalline, white compounds which are very soluble in water and insoluble in ether. Some of the diquaternary ammonium compounds from the esters of Formula 4 are curarizing agents which show a very favourable therapeutic index.

The halo compounds corresponding to the general

Formulas 2 and 3 are comprised by our invention. They may be produced in accordance with known methods for the production of esters, for example from functional derivatives of α-phenyl-α-halogeno-acetic acids, particularly by reacting the chloride of such an acid with the suitable alcohol (of the formula

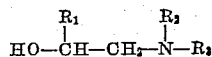

or

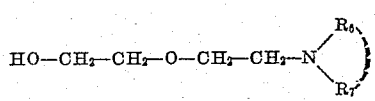

in an anhydrous organic medium) then causing an alkali to set the base free from the hydrochloride thereof thus produced.

The following examples will illustrate our invention.

*Example 1*

(a) β-1,2,5,6-tetrahydropyridino-ethanol: In a 2 litre, three neck flask provided with a mechanical stirrer, a dropping funnel and a reflux cooler, sodium (11.5 g.; 0.5 mol) was dissolved in absolute ethanol (290 ml.).

To the solution thus produced 1,2,5,6-tetrahydropyridine (41.5 g.; 0.5 mol) was added and the mixture cooled with an ice bath. Glycol chlorhydrine (48.3 g.; 0.6 mol) was then dropped through the funnel in an hour.

The mixture was refluxed for 7 hours, allowed to cool, sodium chloride filtered off and washed three times with absolute ethanol.

Ethanol was driven off by distilling the filtrate on a water-bath, and the residue rectified in vacuum.

Tetrahydropyridino-ethanol (42 g.; yield 66.1 percent) was collected at 80–81° C. under 6 mm. Hg.

1,2,5,6-tetrahydropyridino-ethanol was a colourless oil which was soluble in water, ethyl alcohol, ether, indeed most organic solvents. The hydrochloride thereof prepared by dissolving the base in anhydrous ether and passing dry hydrogen chloride through the ether solution, and recrystallised from a mixture of methyl-ethyl-ketone and ethyl alcohol (5:1) was obtained as a white, slightly hygroscopic, water-soluble, crystalline compound. The melting point thereof was 105–107° C.

*Analysis.*—Cl (calculated) 21.71%. Cl (found) 21.64%.

(b) Hydrochloride of β-diethylamino-ethyl α-phenyl-α-chloro-acetate: Into a solution of α-phenyl-α-chloro-acetic acid chloride (245 g.; 1.29 mol) prepared according to Bischoff & Walden, Liebig-Annalen, 279, 1894, p. 122, in anhydrous ether (1000 ml.), the solution being cooled externally by an ice bath, a solution of β-diethyl-amino-ethanol (151 g.; 1.29 mol) in anhydrous ether (800 ml.) was introduced slowly (in 1 hour) while stirring continuously.

Diethylamino-ethyl α-phenyl-α-chloro-acetate hydrochloride separated immediately as a white, crystalline precipitate.

After the introduction was ended, the mixture was maintained for a further hour in the ice bath then left standing for 24 hours at room temperature. It was filtered, and the solid washed repeatedly with anhydrous ether then dried in air.

A crude product sample recrystallised from isobutyl alcohol had a M.P. of 123° C.

*Analysis.*—Cl (calculated) 11.60%. Cl (found) 11.71%.

(c) Diethylamino-ethyl α-phenyl-α-chloro-acetate: The crude diethylamino-ethyl α-phenyl-α-chloro-acetate hydrochloride of which 357 g. (yield 90.6%) was obtained was dissolved in water (1000 ml.). The aqueous solution was made alkaline up to pH 9 by means of a saturated aqueous solution of sodium carbonate; the diethyl-amino-ethyl α-phenyl-α-chloro-acetate separated as an oil which was extracted 4 times successively with ether (500 ml.).

The combined ether extracts were dried over sodium sulphate, ether driven off, and crude diethylamino-ethyl α-phenyl-α-chloro-acetate (236 g.) immediately employed in the next step to be described now.

(d) Diethylamino-ethyl α-phenyl-α-1,2,5,6-tetrahydropyridino acetate: 1,2,5,6-tetrahydropyridine (34.8 g.; 0.42 mol) was added to a solution of diethylamino-ethyl α-phenyl-α-chloro-acetate (56.4 g.; 0.21 mol) in anhydrous benzene (250 ml.). The mixture was refluxed for 8 hours, then allowed to cool, the precipitated tetrahydropyridine hydrochloride filtered off and washed repeatedly with anhydrous benzene.

The benzene washing liquors were combined with the filtrate and benzene driven off by distillation on a water-bath (the last traces in vacuum).

The residual oil was taken up with water (200 ml.) stirred for a few minutes in a separating bulb then extracted three times with ether (200 ml. for each extraction). The combined ether extracts were dried over sodium sulphate, ether driven off and the oil distilled in a high vacuum.

We thus obtained diethylamino-ethyl α-phenyl-α-1,2,5,6-tetrahydropyridino acetate (45.5 g.; yield 68.9%) distilling at 167–170°/0.8 mm. Hg as a viscous light yellow oil.

(e) Diethylamino-ethyl α-phenyl-α-1,2,5,6-tetrahydropyridino acetate dihydrochloride: Dry hydrogen chloride was passed through a solution of diethylamino-ethyl α-phenyl-α-1,2,5,6-tetrahydropyridino-acetate (10 g.) in anhydrous ether (400 ml.) until the precipitation was ended. The dihydrochloride was filtered off, washed twice with anhydrous ether and dried in vacuum.

For purifying the dihydrochloride, the compound was dissolved in as little an amount of isopropanol as possible and reprecipitated therefrom by means of a big volume of anhydrous ether.

The diethylamino-ethyl α-phenyl-α-1,2,5,6-tetrahydropyridino-acetate dihydro-chloride was a white compound which was hygroscopic to such an extent that we did not succeed in determining the melting point thereof.

*Analysis.*—Cl (calculated) 18.25%. Cl (found) 17.72%.

(f) Prepared in a similar manner, the dihydrobromide had the advantage of not being hygroscopic; M.P. 200° C.; it was soluble in water and in ethyl alcohol, insoluble in methyl-ethyl-ketone.

*Example 2*

Working in accordance with Example 1 but substituting β-1,2,5,6-tetrahydropyridino-ethanol for β-diethylamino-ethanol, and pyridine for 1,2,5,6-tetrahydropyridine, we obtained successively:

(a) The β-1,2,5,6-tetrahydropyridino-ethyl α-phenyl-α-chloro-acetate hydrochloride (yield 63.3%), being an oily substance;

(b) The corresponding base;

(c) The β-1,2,5,6-tetrahydropyridino-ethyl α-phenyl-α-piperidino acetate (yield 61.4%), a viscous light yellow oil which distilled at 180–182° C./0.05 mm. Hg;

(d) The dihydrochloride of base (c) which recrystallised from a mixture (2:1) of methyl-ethyl-ketone and ethanol, was obtained as a white, crystalline, non-hygroscopic substance which was very soluble in water. M.P. 225–226° C.

*Analysis.*—Cl (calculated) 17.70%. Cl (found) 17.70%.

Working in accordance with Example 1, we further prepared:

A. The hydrochlorides of:

|  | M.P. (degrees C.) | Yield (percent) | Analysis: Cl Calc., percent | Analysis: Cl Found, percent |
|---|---|---|---|---|
| β-piperidino-ethyl | 148–149 | 83.5 | 11.16 | 11.30 |
| β-morpholino-ethyl | 166 | 74.4 | 11.09 | 11.30 |
| 3′-(N-ethyl-piperidinyl) | 166° (hygr.) | 99.8 | 11.16 | 10.99 |

α-phenyl-α-chloro-acetates.

B. The compounds tabulated below corresponding to formula

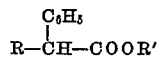

$$R-\underset{\underset{C_6H_5}{|}}{CH}-COOR'$$

and the dihydrochlorides thereof:

| R | R' | Base Boiling point (mm. Hg) | Base Yield (percent) | Dihydrochlorides M.P. | Analysis (Cl, percent) calculated | Analysis (Cl, percent) found |
|---|---|---|---|---|---|---|
| 4-CH₃-piperidino | —CH₂CH₂N(C₂H₅)₂ | 192–193 (3) | 42.20 | 225 | 17.53 | 16.79 |
| 3-CH₃-piperidino | —CH₂CH₂N(C₂H₅)₂ | 164–166 (0.05–0.6) | 68.20 | 227 (hygros.) | 17.53 | 17.31 |
| pyrrolidino | —CH₂CH₂N(C₂H₅)₂ | 138–140 (0.05) | 60.30 | 135–140 (hygrosc.) | 18.83 | 18.75 |
| morpholino | —CH₂CH₂N(C₂H₅)₂ | 154–156 (0.05–0.06) | 55.62 | 143–154 (hygrosc.) | 18.06 | 18.08 |
| 4-CH₃-piperidino | —CH₂CH₂-piperidino | 185–187 (1) | 66.60 | 239 | 17.02 | 16.67 |
| 3-CH₃-piperidino | —CH₂CH₂-piperidino | 180–182 (0.6–0.8) | 68.90 | 229 | 17.02 | 17.00 |
| tetrahydropyridino | —CH₂CH₂-piperidino | 215–218 (1.5) | 48.80 | 236 | 17.10 | 17.02 |
| pyrrolidino | —CH₂CH₂-piperidino | 168–170 (0.5) | 66.00 | 218 (hygrosc.) | 18.25 | 17.95 |
| morpholino | —CH₂CH₂-piperidino | 174–176 (0.05) | 36.00 | 175–175 (hygrosc.) | 17.53 | 16.26 |
| 4-CH₃-piperidino | N-ethyl-piperidinyl | 170–172 (0.5) | 61.05 | 235 (hygrosc.) | 17.61 | 17.64 |
| 4-CH₃-piperidino | N-ethyl-piperidinyl | 168–169 (0.2) | 60.82 | 233 (imprecis) | 17.02 | 17.35 |
| 3-CH₃-piperidino | N-ethyl-piperidinyl | 177 (0.4) | 64.00 | 216 (imprecis) | 17.02 | 17.08 |
| tetrahydropyridino | N-ethyl-piperidinyl | 215–218 (1.5) | 48.80 | 236 | 17.10 | 17.02 |
| pyrrolidino | N-ethyl-piperidinyl | 160–162 (0.5) | 69.62 | (hygrosc.) | 18.25 | 18.09 |

| R | R' | Base | | Dihydrochlorides | | |
|---|---|---|---|---|---|---|
| | | Boiling point (mm. Hg) | Yield (percent) | M.P. | Analysis (Cl, percent) | |
| | | | | | calculated | found |
| O⟨ring⟩N— | ⟨ring with N–C₂H₅⟩ | 172–174 (0.7) | 59.50 | 214 (hygrose.) | 17.53 | 17.33 |
| ⟨ring⟩N— | —CH₂CH₂N⟨ring⟩ | 189–190 (0.8) | 60.70 | 217 | 17.79 | 17.77 |

Example 3

(a) Hydrochloride of diethylamino-ethoxy-ethyl α-phenyl-α-chloro-acetate: A solution of diethylamino-ethoxy-ethanol (12.9 g.; 0.08 mol) in anhydrous ether (100 ml.) was added slowly (in 30 minutes) with continuous stirring to a solution of α-phenyl-α-chloro-acetic acid chloride (15.2 g.; 0.08 mol) in anhydrous ether (100 ml.) externally cooled with an ice bath.

The hydrochloride of diethylamino-ethoxy-ethyl α-phenyl-α-chloro-acetate separated in pasty form.

After the addition was ended, the mixture was maintained for 2 hours in an ice bath with stirring then left standing for 24 hours at room temperature. Ether was decanted.

(b) Diethylamino-ethoxy-ethyl α-phenyl-α-chloro acetate: The crude hydrochloride (a) was dissolved in as little water as possible. The aqueous solution was made alkaline to pH 9 by means of a saturated aqueous solution of sodium carbonate; diethylamino-ethoxy-ethyl α-phenyl-α-chloro-acetate separated as an oil which was extracted 4 times successively with ether (100 ml. each time).

The combined ether extracts were dried over sodium sulphate, ether driven off and crude diethylamino-ethoxy-ethyl α-phenyl-α-chloro-acetate (22.1 g.; yield 88%) immediately employed in the next step to be described now.

(c) Diethylamino-ethoxy-ethyl α-phenyl-α-1,2,5,6-tetrahydropyridino acetate: 1,2,5,6-tetrahydropyridine (11.8 g.; 0.142 mol) was added to a solution of diethylamino-ethoxy-ethyl α-phenyl-α-chloro-acetate (22.1 g.; 0.071 mol) in anhydrous benzene (150 ml.). The mixture was refluxed for 8 hours, allowed to cool, precipitated 1,2,5,6-tetrahydropyridine hydrochloride filtered off and washed repeatedly with anhydrous benzene.

The benzene washing liquors were combined with the filtrate and benzene driven off by distillation on a water-bath (the last traces in vacuum).

The residual oil was taken up with water (50 ml.) stirred for a few minutes in a separating bulb then extracted 3 times with ether (120 ml. each time).

The combined ether extracts were dried over sodium sulphate, ether driven off, and the oil rectified twice in a high vacuum.

Diethylamino-ethoxy-ethyl α-phenyl-α-1,2,5,6-tetrahydropyridino-acetate (10.7 g.; yield 42%) distilling at 189–191°/0.3 mm. Hg was finally obtained as a viscous, light yellow oil.

(d) Diethylamino-ethoxy-ethyl α-phenyl-α-1,2,5,6-tetrahydropyridino acetate dihydrochloride: A solution of hydrochloric acid in anhydrous ether was added drop by drop until precipitation was ended, to a solution of diethylamino-ethoxy-ethyl α-phenyl-α-1,2,5,6-tetrahydropyridino-acetate (5.4 g.) in anhydrous ether (100 ml.). The dihydrochloride was filtered off, washed repeatedly with anhydrous ether and dried in vacuum.

Recrystallised from anhydrous acetone, the said dihydrochloride was obtained as a white, hygroscopic crystalline compound which was soluble in water and ethyl alcohol but insoluble in ethyl acetate and methyl-ethyl-ketone; M.P. 161° C.

Analysis.—Cl (calc.) 16.39%. Cl (found) 16.04%.

(e) Diethylamino - ethoxy - ethyl α-phenyl-α-1,2,5,6-tetrahydropyridino acetate dimethiodide: Methyliodide (2.9 g.; 0.02 mol) was added to a solution of diethylamino-ethoxy-ethyl α-phenyl-α-1,2,5,6-tetrahydropyridino-acetate (3.6 g.; 0.01 mol) in anhydrous ether (15 ml.). The mixture was left standing for 3 hours at room temperature; the precipitated dimethiodide was filtered off, washed with anhydrous acetone and dried in vacuum.

Diethylamino-ethoxy-ethyl α-phenyl-α-1,2,5,6-tetrahydropyridino-acetate dimethiodide (5.5 g.; yield 84.6 M) after recrystallisation from absolute ethanol was finally obtained as a white, water-soluble, non-hygroscopic, crystalline substance; M.P. 167° C.

Analysis.—I (calc.) 39.44%. I (found) 39.54%.

Working in accordance with Example 3, we further obtained:

(A) The hydrochloride of piperidino-ethoxy-ethyl α-phenyl-α-chloro-acetate (M.P. 116° C.; yield 98%; calc. Cl 9.80%; found 9.72%);

The hydrochloride of morpholino-ethoxy-ethyl-α-phenyl-α-chloro-acetate (M.P. 84° C.; yield 80%; calc. Cl 9.75%; found 9.84%).

Piperidino ethoxy ethanol was prepared as follows:

A mixture of 2-(2'-chloro-ethoxy)-ethyl acetate (50 g.; 0.3 mol) prepared according to Blicke and Biel, Journal of the American Chemical Society, 76, 1954, page 3164, piperidine (76.5 g.; 0.9 mol) and absolute alcohol (75 ml.) was heated to 120–125° C. for about 18 hours. Alcohol was driven off on a water-bath (the last traces in vacuum). The mixture was taken up with water (30 ml.) then made alkaline with 40 percent caustic soda lye (40 ml.) and stirred for a few minutes in a separating bulb. The separated oil was then extracted 4 successive times with ether (100 ml. each time).

The combined ether extracts were dried over sodium sulphate, ether driven off and the residual oil rectified in vacuum.

Piperidino-ethoxy-ethanol (39.5 g.; yield 76 percent) was finally obtained as a colourless liquid distilling at 105–106° C./3 mm. Hg.

The hydrochloride thereof, recrytallised from acetone, was a white, slightly hygroscopic, water-soluble, crystalline compound; M.P. 120° C.

Analysis.—Cl (calc.) 16.94%. Cl (found) 16.94%.

Similarly prepared with a yield of 69.7 percent, morpholino-ethoxy-ethanol was a colourless liquid distilling at 106–108° C./3 mm. Hg.

The hydrochloride thereof, recrystallised from isopropanol, was a white, water-soluble, crystalline compound; M.P. 157° C.

Analysis.—Cl (calc.) 16.78%. Cl (found) 16.65%.

(B) The compounds tabulated below, corresponding to the general formula $$R-\overset{\underset{|}{C_6H_5}}{CH}-\overset{\underset{\|}{O}}{C}-O-CH_2-CH_2-O-CH_2-CH_2-R'$$

the dihydrochlorides, and the dimethiodides thereof:

upon intravenous administration to white mice; Kaerber-Behrens method) and the spasmolytic activity thereof as measured on isolated guinea-pig intestine (towards acetylcholine spasm, diethylamino-ethyl diphenylacetate being taken as a standard for comparison; and towards the spasm caused by barium chloride, papaverine hydrochloride being taken as a standard for comparison).

| R | R' | Base | | Dihydrochlorides | | | Dimethiodides | | |
|---|---|---|---|---|---|---|---|---|---|
| | | Boiling point (mm. Hg) | Yield (Percent) | Melting point, °C. | Analysis (Cl, Percent) | | Melting point, °C. | Analysis (I, Percent) | |
| | | | | | calc. | found | | calc. | found |
| ⬡N— | —N(C₂H₅)₂ | 186–187° (0.4) | 73.8 | ------ | ------ | ------ | 196 | 39.31 | 38.62 |
| ⬡N— | —N⬡O | 218–220° (1) | 72 | 211–212 | 15.81 | 15.60 | 201 | 38.48 | 38.13 |
| ⬡N— | —N⬡ | 190–192° (0.2) | 45.1 | 214 | 15.88 | 15.49 | 210 | 38.60 | 38.10 |
| ⬡N— | —N⬡O | 203–205° (0.2) | 56.7 | 198 | 15.88 | 15.70 | 201 | 38.60 | 38.39 |
| ⬡N— | —N⬡ | 199–200° (0.5) | 76 | (hygrosc.) | 15.95 | 15.97 | 176 | 38.71 | 38.87 |

The various final products of the foregoing three examples (including those above tabulated) were tested with a view to determining the toxicity thereof ($FD_{50}$ upon intravenous administration to white mice; Kaerber-Behrens method).

The various compounds were generally found little toxic and effective as spasmolytics. The following three compounds showed outstanding properties and are preferred:

| Compound | $FD_{50}$ (mg./kg.) | Spasmolytic activity towards— | |
|---|---|---|---|
| | | Acetylcholine | BaCl₂ |
| $HC(C_6H_5)(N\text{-piperidyl-4-methyl})-C(=O)-O-CH_2-CH_2-N(C_2H_5)_2$ | 80 | 0.75 | 6 |
| $HC(C_6H_5)(N\text{-piperidyl})-C(=O)-O-CH_2-CH_2-N(C_2H_5)_2$ | 97 | 1 | 5 |
| $HC(C_6H_5)(N\text{-piperidyl})-C(=O)-O-CH_2-CH_2-N\text{-piperidyl}$ | 107 | 0.5 | 4 |

What we claim is:
1. A dimethiodide of the formula

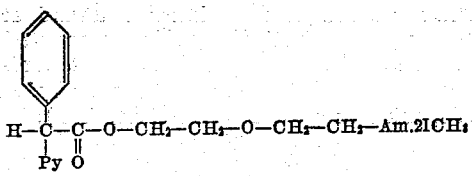

wherein

Py represents a member selected from the class consisting of 1,2,5,6-tetrahydropyridino group and piperidino group, and Am represents a member selected from the class consisting of diethylamino group, morpholino group and piperidino group.

2. The diethylamino dimethiodide of the formula:

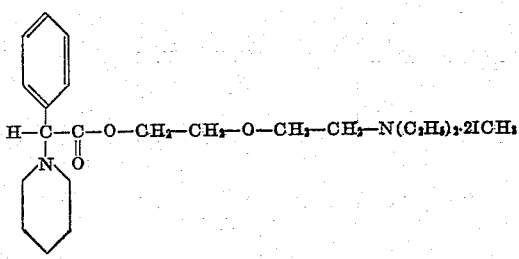

3. The diethylamino dimethiodide of the formula

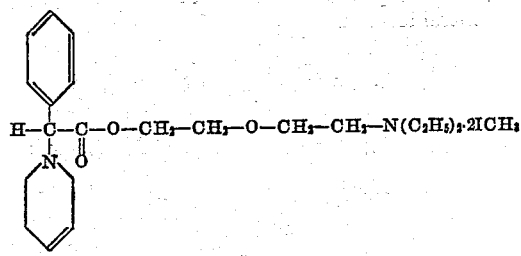

References Cited in the file of this patent

UNITED STATES PATENTS 2,830,057    Hoffman et al. _____ Apr. 8, 1958

OTHER REFERENCES

Friebel et al.: Naunyn Schmiedebergs Arch. Exptl. Pathol. Pharmakol, vol. 221, p. 261 (1954).

Moffett et al.: J. Am. Pharm. Assoc., vol. 42, p. 719 (1953).

Blicke et al.: J. Am. Chem. Soc., vol. 76, pp. 3161–3162 (1954).